July 4, 1950 — W. H. KLIEVER — 2,513,493
AIRCRAFT CONTROL SYSTEM
Filed Sept. 17, 1945
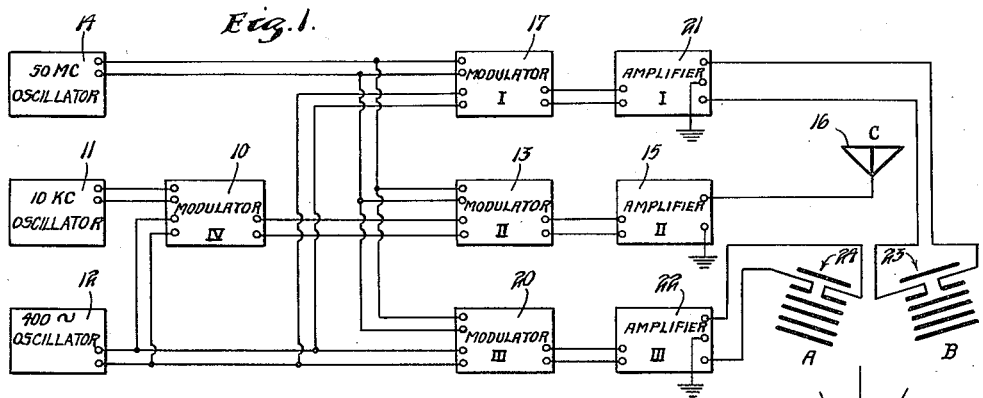
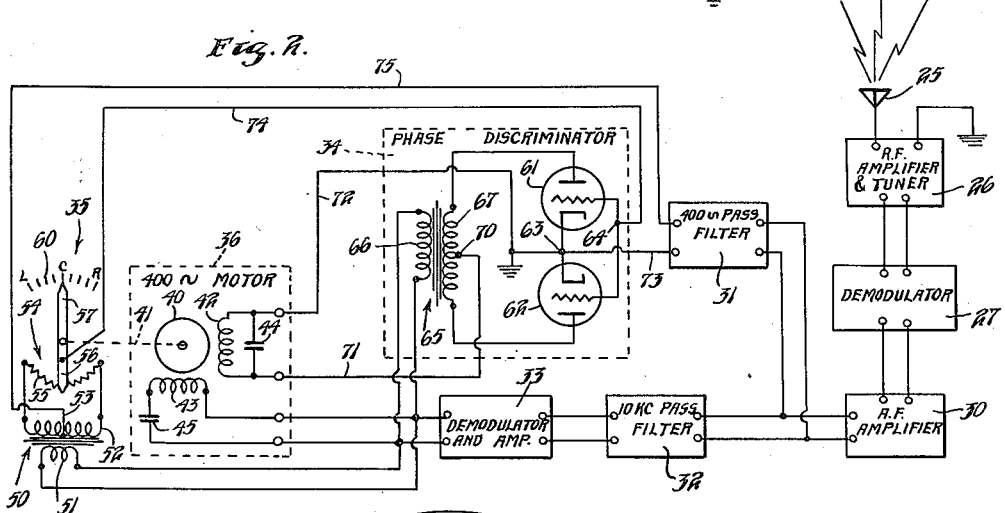
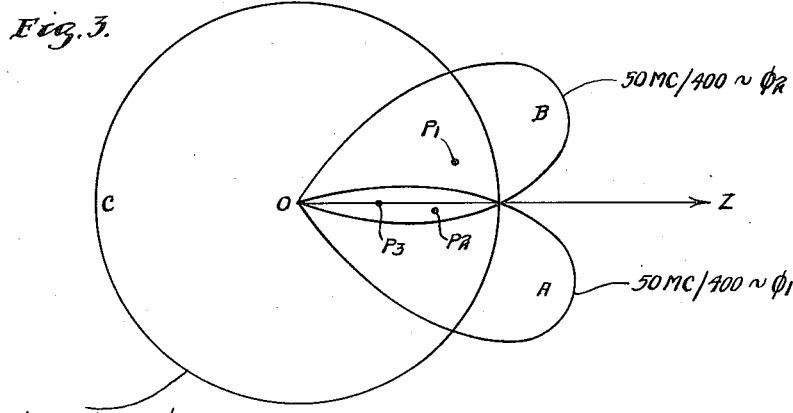
INVENTOR.
WALDO H. KLIEVER
BY George H. Fisher
ATTORNEY Patented July 4, 1950

2,513,493

UNITED STATES PATENT OFFICE 2,513,493

AIRCRAFT CONTROL SYSTEM

Waldo H. Kliever, Minneapolis, Minn., assignor to Minneapolis-Honeywell Regulator Company, Minneapolis, Minn., a corporation of Delaware Application September 17, 1945, Serial No. 616,826

11 Claims. (Cl. 343—107)

This invention relates to the field of aeronautical radio engineering and particularly to that phase of the art which concerns itself with instrument landing of aircraft. Various systems for insuring safe landing of craft at stations where the weather is overcast have been worked out but are found to have various limitations and undesirable features, and it is an object of this invention to provide a new and improved blind landing system obviating the difficulties of previous systems.

It is another object of this invention to provide a blind landing system in which the signal received in the craft is susceptible, without conversion, of operating a split phase alternating current motor.

It is another object of this invention to provide a blind landing system in which a fixed transmitter emits radiations having low frequency components in opposite phase relationships, together with a further radiation establishing one of said low frequency components as a reference phase.

It is another object of this invention to provide a blind landing system in which a receiver carried by the craft derives from a complex signal a pair of low frequency components, one of which is established as a reference phase to which the other is compared.

It is another object of this invention to provide a blind landing system in which a transmitter emits radiations having low frequency components in different phase relations, together with a radiation establishing one of said low frequency components as a reference phase, while the receiver derives from the complex signal made up of these various radiations a pair of low frequency components one of which is established as a reference phase to which the other is compared.

A further object of this invention is to provide a blind landing system in which three radiations are emitted at a common carrier frequency, two of the radiations being modulated at a power frequency in opposite phase relation, while the third is doubly modulated to have a component of the power frequency and in phase with a modulation of one of the modulated radiations.

It is a further object of this invention to provide a blind landing system in which a complex signal is demodulated to derive a power frequency signal, which is in phase or 180° out of phase with a reference phase, depending on the location of the receiver with respect to the transmitter, and a less complex signal which is again demodulated to derive a power frequency signal acting as the reference phase referred to above, the doubly demodulated signal and the first mentioned signal operating the motor of a rebalancing indicator.

It is a further object of this invention to provide a blind landing system in which three radiations are emitted at a common carrier frequency, two of the radiations being modulated at a power frequency in opposite phase relation while the third is doubly modulated to have a component of the power frequency and in phase with the modulation of one of the singly modulated radiations, and in which a receiver tuned to the carrier frequency demodulates the complex signal to derive a power frequency signal, which is in phase or 180° out of phase with a reference phase, depending on the location of the receiver with respect to the transmitter, and a less complex signal which is again demodulated to derive a power frequency signal acting as the reference phase referred to above, the doubly demodulated signal and the first mentioned signal operating the motor of a rebalancing indicator.

A still further object of our invention is a blind landing system in which a complex signal is demodulated to derive a power frequency signal, which is in phase or 180° out of phase with a reference phase, depending on the location of the receiver with respect to the transmitter, and a less complex signal which is again demodulated to derive a power frequency signal acting as the reference phase referred to above, the doubly demodulated signal and the first-mentioned signal operating the motor of a rebalancing indicator, the rebalancing being accomplished by adding to the first-mentioned signal a signal derived from the doubly demodulated signal.

A still further object of this invention is to provide a blind landing system in which three radiations are emitted at a common carrier frequency, two of the radiations being modulated at a power frequency in opposite phase relationship while the third is doubly modulated to have a component of the power frequency and in phase with the modulation of one of the modulated radiations, together with a receiver in which a complex signal is demodulated to derive a power frequency signal, which is in phase or 180° out of phase with a reference phase, depending on the location of the receiver with respect to the transmitter, and a less complex signal which is again demodulated to derive a power frequency signal acting as the reference phase referred to above, the doubly demodulated signal and the first-mentioned signal operating the motor of a rebalancing indicator, the rebalancing being accomplished by adding to the first-mentioned signal a signal derived from the doubly demodulated signal.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the drawing, Figure 1 is a diagrammatic showing of a radio transmitter suitable for use in my blind landing system;

Figure 2 is a similar showing of a receiver and indicator for use in my system, and Figure 3 is a diagram illustrative of the phase distribution of the radiation sent out by my transmitter.

Referring first to Figure 3, I have shown a radio transmitter located at a point O, with respect to which three aircraft are located at points P1, P2, and P3. From transmitter O there are sent out three radiations, by means which will presently be described. The first of these radiations has a directional pattern as indicated at A, and comprises a fifty megacycle carrier wave modulated at 400 cycles in a first phase relationship. A second radiation B is also emitted by transmitter O in a space distribution similar to that of A, but this radiation, while on a carrier frequency of fifty megacycles, is modulated at 400 cycles in the opposite phase to that modulating the radiation A. A third, non-directional radiation C emitted from transmitter O comprises a doubly modulated carrier frequency of fifty megacycles, the first modulation being at ten kilocycles and the second modulation being at 400 cycles in the same phase as radiation A. The same source of carrier frequency is used for all radiation.

The craft carries a radio receiver tuned to the carrier frequency of fifty megacycles, and including a pair of demodulators, the first of these demodulators removing the carrier frequency so that its output is a composite of 400 cycles and modulated ten kilocycles. These two frequencies are separated by suitable filters, and the ten kilocycle signal is again demodulated to derive 400 cycles therefrom. Since the 400 cycle voltage carried as a double modulation on the carrier frequency is non-directionally radiated, it will be received by the transmitter regardless of the position of the craft, and therefore may be considered a standard or reference phase. On the other hand, when the craft is located at point P1, only that singly modulated carrier is appreciably received which is emitted by radiation B, due to the directional nature of the transmission. After demodulation, this low frequency is 180° out of phase with the standard of phase.

A craft located at P2 receives appreciable radiation from both directional emitters; but due to its position the radiation received from emitter A exceeds that received from emitter B, and the singly demodulated low frequency is therefore in phase with the reference.

To a craft located at point P3 on the line O—Z, the radiations from emitters A and B are equally received, and since they are opposite in phase they completely cancel out, no signal therefore being available for comparison with the reference phase. If the transmitter is set up in such a fashion that the line O—Z is along the desired landing direction for aircraft, any craft following the zero signal line will be travelling in a proper azimuth for a correct landing at the station supervised by my invention.

It will be appreciated, of course, that this invention relates only to the azimuth factor in blind landing systems, and that the glide factor may be handled according to well known principles.

Referring now to Figure 1, it will be seen that in a modulator 10 the output of a ten kilocycle oscillator 11 is modulated at 400 cycles from an oscillator 12. In a second modulator 13 this modulated voltage is used to modulate the output of a fifty megacycle oscillator 14, and the doubly modulated voltage is amplified in amplifier 15 and radiated from a suitable non-directional antenna 16. At the same time, in modulators 17 and 20 high frequency voltages from the fifty megacycle oscillator are modulated with 400 cycles from the low frequency oscillator in opposite phase relation, and the modulated voltages are amplified in amplifiers 21 and 22, respectively. A pair of directional antennas 23 and 24, which may conveniently comprise Yagi arrays, are provided for radiating the output of amplifiers 21 and 22. Antenna 16 transmits the radiation C in Figure 3, while radiations A and B in Figure 3 are transmitted by antennas 24 and 23, respectively. Oscillators, modulators, amplifiers, and directional and non-directional antennas are well known to those skilled in the art, and detailed construction of these familiar components of my invention is not here included.

The receiver shown in Figure 2 of the drawing comprises a non-directional antenna 25 energizing a radio frequency amplifier and tuner. This unit is tuned to fifty megacycles, and its output passes through a demodulator 27 whose output in turn is amplified in an audio frequency amplifier 30. The output of the audio amplifier is fed to a pair of filters 31 and 32, the first of which passes alternating current of 400 cycles but presents a high impedance to alternating current of 10 kilocycles, while the second presents a high impedance to alternating voltage of 400 cycles but permits 10 kilocycle voltage to pass freely. The output of filter 32 is demodulated in a second demodulator 33 which may also perform an amplifying function, and whose output energizes a phase discriminator 34, a rebalancing arrangement 35, and one winding of a split phase motor 36. The output of filter 31 also energizes phase discriminator 34 whose output in turn energizes a second winding of motor 36.

Demodulators, high and low pass filters, amplifiers and tuners are individually well known to those skilled in the art, and details of the structure of such units as are used in my invention will not be given here. For the sake of clarity, however, it appears desirable to recite in some detail the structure and relationship of elements 34, 35, and 36, and this will now be undertaken.

Motor 36 is of the conventional split base construction and comprises an armature 40, carried on a shaft 41, and a pair of field windings 42 and 43, a condenser 44 being connected in parallel with winding 42 and a condenser 45 being connected in series with winding 43. This series circuit is energized from the output of demodulator 33, which it will be remembered is constant in phase. The capacitance of condenser 45 is so chosen with respect to the inductance of winding 43 that the circuit is resonant at a frequency of 400 cycles: the current through coil 43 is therefore in phase with the voltage output of demodulator 33. Similarly, the circuit includes winding 42 and condenser 44 is designed for resonance at 400 cycles.

Rebalancing device 35 is shown to comprise a transformer 50 having a primary winding 51 and a secondary winding 52 center tapped as at 53. The rebalancing device also comprises a potential divider 54 having a resistance winding 55 and a contacting slider 56. Winding 55 is connected across the terminals of secondary winding 52 of transformer 50. Slider 56 is mounted on shaft 41 of motor 36, for actuation thereby, and mounted for unitary motion therewith is a pointer 57 moving with respect to a scale 60 to indicate the position of shaft 41 at any given moment.

Phase discriminator 34 is shown to comprise a pair of triodes 61 and 62 whose cathodes are joined to a common terminal 63 and whose grids are joined to a common terminal 64, and a transformer 65 having a primary winding 66 and a secondary winding 67 center tapped at 70. Winding 42 of motor 36 is energized from center tap 70 and terminal 63 through conductors 71 and 72, respectively. Terminal 63 is connected with one output terminal of filter 31 by conductor 73, and grid terminal 64 is energized from filter 31 and from potential divider 54 acting jointly, through a circuit which may be traced as follows: terminal 64, conductor 74, slider 56, winding 55, of potential divider 54, winding 52 of transformer 50, center tap 53, and conductor 75. The plates of triodes 61 and 62 are energized from the terminals of secondary winding 67 of transformer 65.

*Operation*

The operation of the transmitter portion of my invention will be self-evident from the figure. Oscillators 11 and 12, modulator 10, oscillator 14, modulator 13, amplifier 15, and antenna 16 cooperate to bring about radiation of a non-directional, doubly modulated fifty megacycle carrier signal. Oscillators 12 and 14, modulator 20, amplifier 22, and directional antenna 24 cooperate to radiate a fifty megacycle signal modulated at 400 cycles in a first phase relationship and having a particular space distribution. Oscillators 12 and 14, modulator 17, amplifier 21, and directional antenna 23 cooperate to radiate a fifty megacycle carrier signal modulated at 400 cycles in a phase 180 degrees spaced from that radiated by antenna 24, and in a space distribution which partially overlaps the radiation from antenna 24. Antennas 23 and 24 are so placed as to be less than one wave length of the carrier frequency apart, and the antennas are so arranged that the direction of zero signal lies along the direction in which it is expected that the craft carrying the receiver will follow in landing.

The operation of my receiver is as follows, assuming that no other radiation on a fifty megacycle carrier is significant at the instantaneous location of the receiving antenna. Antenna 25 receives the radiation from antennas 16, 24, and 23, in relative intensities depending upon the location of the receiving antenna with respect to the transmitting station. This complex signal is amplified in unit 26, and demodulated in unit 27 to remove the carrier component. The output of demodulator 27 therefore comprises a complex audio frequency signal whose components in turn depend upon the location of the craft with respect to the transmitting station. This complex audio signal is amplified in unit 30 and transmitted to filters 31 and 32.

The output from amplifier 30 comprises two components, a simple 400 cycle component which is of a first phase or the opposite phase, depending upon the location of the receiving antenna with respect to the directional pattern sent out by radiations A and B, and a 10,000 cycle signal modulated at 400 cycles which is always in phase with the 400 cycle signal derived from emitter A. Filter 32 is constructed to pass 10,000 cycle signals without substantial attenuation, and in passing the 10,000 cycle the 400 cycle modulation which is impressed upon it is also passed. The output of filter 32 passes through demodulator 33 and the ten kilocycle component is removed from the signal leaving only a 400 cycle signal which is in phase with the signal transmitted from emitter A.

The 400 cycle signal to which filter 32 presented a high impedance is transmitted through filter 31 without substantial attenuation, while filter 31 presents a very high impedance to a 10,000 cycle signal. It is thus apparent that filters 31 and 32 comprise means for dividing the complex signal derived from amplifier 30 into two portions according to the frequencies of the portions, and handling the two portions separately in the two ensuing circuits. It will also be realized that while the output of demodulator 33 is of a fixed phase, the output of filter 31 reverses in phase as the aircraft passes from one side of line O—Z to the other.

The voltage across secondary winding 52 of transformer 50, and therefore that across winding 55 of potential divider 54, has the frequency and phase of the output of demodulator 33; that is, it is in phase with radiation from emitter A. When slider 56 is at the center of winding 55, no voltage derived from the secondary winding appears between the sliders of center tap 53, and conductors 74 and 75 simply comprise the conductive path between filter 31 and the grids of triodes 61 and 62. However, if slider 56 is displaced from the center of winding 55 in a first direction, a voltage is derived from the winding and impressed between conductors 74 and 75 which is of a first phase relationship with respect to the voltage output of demodulator 33, while if the slider is displaced from the center of winding 55 in the opposite direction the voltage between conductors 74 and 75 is of the opposite phase relation with respect to the output of demodulator 13. In either case, the voltage derived from potential divider 54 is connected to add to the voltage derived from filter 31, and the sum of the voltages is impressed on the grids of triodes 61 and 62. It will be realized that if the two voltages are in phase, the sum of the two voltages is greater than either taken separately, and therefore the voltage derived from potential divider 54 augments the signal transmitted through the filter, while if the two voltages are out of phase the voltage derived from the voltage divider decreases the effect of the signal derived from the filter. Transformer 50, potential divider 54, and conductors 74 and 75 therefore comprise a feedback circuit to provide either positive or negative feedback to the input of discriminator 34, depending upon the position of slider 56 with respect to the center of winding 55.

Primary winding 66 of transformer 65 is energized from the output of demodulator 33, and the anodes of triodes 61 and 62 are energized from the output of secondary winding 67 of transformer 65. From the foregoing it follows that the voltage between the grids of triodes 61 and 62 and the cathodes of the triodes is either in phase or 180 degrees out of phase with the voltage between the plates and cathodes of the triodes, having one phase relationship in one triode and the opposite phase relation in the other triode. Thus, when the signal from filter 31 is in a first phase, the grids of both triodes may be negative at the same time, while the plate of triode 61 is positive and the plate of triode 62 is negative. In this case, no current will flow to either triode. During the next half cycle, the plate of triode 61 will be negative while the plate of triode 62 will be positive, and both grids will be positive. Under these conditions, current flows in triode 62 and winding 42 of motor 36 is energized with voltage which is either in phase or 180 degrees out of phase with the voltage energizing winding 43. The current in winding 42 is displaced 90 degrees from the voltage across it due to the action of the inductance of the winding, and the motor therefore operates in a first direction. If the signal derived from filter 31 was of the opposite polarity, so that the grids of the triodes in turn were of opposite polarities with respect to the plate voltages at the time just referred to, the voltage energizing winding 42 would be of the opposite phase relation, and the motor would operate in the opposite direction.

For the case when the aircraft is located at point P1 with respect to the transmitter located at O, the operation of the device is as follows. Substantially no energization from emitter A is received by the receiver. The output from filter 31 is therefore out of phase with the output of the demodulator. The grids of the triodes are positive when plate 62 is positive. The motor is energized to run in a forward direction. Shaft 41 rotates in a counterclockwise direction, so that indicator 57 shows that the craft is to the left of the proper course, and so that a feedback is derived from potential divider 54 which is out of phase with the output of demodulator 33. Operation of motor 40 continues until the feedback signal is equal in magnitude to the signals derived from filter 31, at which point the signal voltage disappears from the grids of the triodes, and energization of winding 42 is interrupted. Motor 40 accordingly comes to a standstill.

When the craft moves to position P2 with respect to transmitter O, radiation is received from both emitters A and B, that from transmitter A predominating. In this case, the signal from filter 31 is in phase with the output of demodulator 33, the grids are positive when the plate of triode 61 is positive, motor 40 runs in a forward direction, shaft 41 moves in a counterclockwise direction, so that indicator 57 indicates that the craft is to the left of the desired course, and the feedback voltage derived from potential divider 54 is out of phase with the voltage output of demodulator 33. Movement of motor 40 continues until the signal on the grids of the anodes is again reduced to zero, when actuation of the motor is interrupted.

It will be observed from the structure and operation of my invention recited above, that the signal received in the craft is of such a nature that in itself it comprises a satisfactory medium for energizing motor 36. No special source of power is required in the aircraft, nor is any vibrator or any converter means required to make the signal derived from the receiver useful to operate the motor.

It will also be appreciated that while my system is adapted particularly for use in blind landing systems for aircraft, it is also useful wherever it is desired to provide reversible actuation of an alternating current motor in response to reversible signals in the form of radiation from a remote transmitter.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matter of shape, size and arrangement of parts, within the principle of the invention, to the full extent indicated by the broad general meaning of the terms in which the appended claims are expressed.

I claim as my invention:

1. In apparatus of the class described, in combination: means emitting a plurality of correlated electromagnetic radiations, in the form of modulated high frequency waves of a single carrier frequency, in a space distribution coordinated with an intelligence to be conveyed; means responsive to said electromagnetic radiations; motor means actuated by said responsive means in accordance with said radiations; and indicating means actuated by said motor means for making evident intelligence derived by said responsive means from said radiations: said emitting means comprising means non-directionally emitting a modulated electromagnetic radiation having a modulating component of fixed low frequency and means directionally emitting, simultaneously with said first-named radiation, further modulated electromagnetic radiations having modulating components of said low frequency, one of said components being in phase and the other being 180° out of phase with said component of said first-named radiation.

2. In apparatus of the class described, in combination: means emitting a plurality of correlated electromagnetic radiations, in the form of modulated high frequency waves of a single carrier frequency, in a space distribution coordinated with an intelligence to be conveyed; means responsive to said electromagnetic radiations; motor means actuated by said responsive means in accordance with said radiations; and indicating means actuated by said motor means for making evident intelligence derived by said responsive means from said radiations: said responsive means comprising means energizing said motor in accordance with the relation between a modulating component of a first of said plurality of radiations and the resultant of the modulating components of others of said plurality of radiations.

3. In apparatus of the class described, in combination: a transmitter comprising means non-directionally emitting an electromagnetic radiation of a high frequency having a modulating component of a fixed low frequency, and means directionally emitting, simultaneously with said first radiation, further electromagnetic radiations of said high frequency having modulating components of said low frequency, one of said components being in phase and another being 180° out of phase with said component of said first-named radiation; and a receiver comprising reversible motor means designed for energization with alternating voltage of said fixed frequency, indicator means actuated by said motor, and motor control means responsive to said electromagnetic radiations for causing energization of said motor in accordance with the relation between said first-named component and the resultant of said two second-named components.

4. In a device of the class described, in combination: a first source of alternating voltage of a power frequency; a second source of alternating voltage of an audio frequency; a third source of alternating voltage of a radio frequency; first means modulating said radio frequency voltage by said power frequency voltage to provide a first modulated voltage; second means modulating said radio frequency voltage by said power frequency voltage to provide a second modulated voltage, said power frequency voltages in said first and second modulating means being 180° out of phase; means modulating said audio frequency voltage by said power frequency voltage to provide a third modulated voltage; means modulating said radio frequency voltage by said third modulated voltage to provide a doubly modulated voltage, and means electromagnetically radiating said first and second modulated voltages and said doubly modulated voltage in selected field intensity patterns.

5. In a device of the class described, in combination: a first source of alternating voltage of a power frequency; a second source of alternating voltage of an audio frequency; a third source of alternating voltage of a radio frequency; first means modulating said radio frequency voltage by said power frequency voltage to provide a first modulated voltage; second means modulating said radio frequency voltage by said power frequency voltage to provide a second modulated voltage, said power frequency voltages in said first and second modulating means being 180° out of phase; means modulating said audio frequency voltage by said power frequency voltage to provide a third modulated voltage; means modulating said radio frequency voltage by said third modulated voltage to provide a doubly modulated voltage; means electromagnetically radiating said doubly modulated voltage non-directionally; and means electromagnetically radiating said first and second modulated voltages individually in selected overlapping directional patterns.

6. In apparatus of the class described, in combination: means directionally emitting a first electromagnetic radiation having a modulation of a selected frequency and phase; means directionally emitting a second electromagnetic radiation having a modulation of said frequency and of the opposite phase, the field strength pattern of said first and second radiations partially overlapping; and means nondirectionally emitting a third electromagnetic radiation having a modulation component of the frequency and phase of the modulation of said first radiation, so that the field strength pattern of said third radiation overlaps the patterns of said first and second radiations.

7. Means for responding to a signal voltage having a low frequency component of variable amplitude and reversible phase and a modulated high frequency component of fixed phase and amplitude, the modulation being of said low frequency and of fixed phase, comprising, in combination: means deriving said signal voltage; means separating said low frequency component from said high frequency component to provide a variable low frequency voltage; means demodulating said high frequency component to provide a comparison low frequency voltage; a low frequency motor; a motor control device having an input circuit, an output circuit, and a power circuit; means energizing said power circuit in accordance with said comparison voltage; means energizing said input circuit in accordance with said variable voltage and with a variable portion of said comparison voltage; means energizing said motor in accordance only with the output from said device and with said comparison voltage; means varying the magnitude and reversing the phase of said variable portion by operation of said motor; and means positioned by said motor.

8. Means for responding to a signal voltage having a low frequency component of variable amplitude and reversible phase and a modulated high frequency component of fixed phase and amplitude, the modulation being of said low frequency and of fixed phase, comprising, in combination: means deriving said signal voltage; means separating said low frequency component from said high frequency component to provide a variable low frequency voltage; means demodulating said high frequency component to provide a comparison low frequency voltage; a low frequency motor; a motor control device having an input circuit, an output circuit, and a power circuit; means energizing said power circuit in accordance with said comparison voltage; a voltage divider adjusted by said motor; means energizing said voltage divider in accordance with said comparison voltage; means energizing said input circuit in accordance with said variable voltage and with the output of said voltage divider; means energizing said motor in accordance with the output of said divider and with said comparison voltage; and means positioned by said motor.

9. Means for responding to a signal voltage having a low frequency component of variable amplitude and reversible phase and a modulated high frequency component of fixed phase and amplitude, the modulation being of said low frequency and of fixed phase, comprising, in combination: means deriving said signal voltage; means separating said low frequency component from said high frequency component to provide a variable low frequency voltage; means demodulating said high frequency component to provide a comparison low frequency voltage; a low frequency motor; a motor control device having an input circuit, an output circuit, and a power circuit; means energizing said power circuit in accordance with said comparison voltage; means energizing said input circuit in accordance with said variable voltage and with a variable portion of said comparison voltage; means energizing said motor in accordance only with the output from said device and with said comparison voltage; means varying the magnitude and reversing the phase of said variable portion by operation of said motor; and an indicator actuated by said motor.

10. Means for responding to a signal voltage having a low frequency component of variable amplitude and reversible phase and a modulated high frequency component of fixed phase and amplitude, the modulation being of said low frequency and of fixed phase, comprising, in combination: means deriving said signal voltage; means separating said low frequency component from said high frequency component to provide a variable low frequency voltage; means demodulating said high frequency component to provide a comparison low frequency voltage; a low frequency motor having a pair of windings in space quadrature; a phase discriminator having an input circuit, an output circuit, and a power circuit; means energizing said power circuit in accordance with said comparison voltage; means energizing said input circuit in accordance with said variable voltage and with a variable portion of said comparison voltage; means energizing one winding of said motor in accordance with the output from said discriminator; means energizing the other winding of said motor in accordance with said comparison voltage; means varying the magnitude and reversing the phase of said variable portion by operation of said motor; and means positioned by said motor.

11. In combination: means directionally radiating electromagnetic signals in overlapping patterns having a rectilinear equipotential line, said signals having a common carrier frequency and a common modulation frequency, the modulations being of opposite phase; means non-directionally radiating a doubly modulated electromagnetic signal comprising the same carrier frequency modulated at an intermediate frequency which is in turn modulated at said common modulation frequency in phase with the modulation of one of said directionally radiated signals; and receiving means responsive to the relationship of the sum of said directionally radiated signals to the lowest frequency component of said doubly modulated signal.

WALDO H. KLIEVER.

REFERENCES CITED

The following references are of record in the file of this patent:

UNITED STATES PATENTS

| Number | Name | Date |
|---|---|---|
| 1,961,206 | Dramond | June 5, 1934 |
| 1,985,046 | Marrison | Dec. 18, 1934 |
| 2,144,203 | Shanklin | Jan. 17, 1939 |
| 2,165,304 | Runze | July 11, 1939 |
| 2,183,725 | Seeley | Dec. 19, 1939 |
| 2,236,374 | Marrison | Mar. 25, 1941 |
| 2,256,482 | Isbister | Sept. 23, 1941 |
| 2,256,487 | Moseley | Sept. 23, 1941 |
| 2,288,815 | Luck | July 7, 1942 |
| 2,314,093 | Landon | Mar. 16, 1943 |
| 2,433,195 | Bond | Dec. 23, 1947 |
| 2,438,288 | Jacobson et al. | Mar. 23, 1948 |
| 2,440,755 | O'Brien | May 4, 1948 |

FOREIGN PATENTS

| Number | Country | Date |
|---|---|---|
| 547,183 | Great Britain | Aug. 17, 1942 |
| 525,182 | Great Britain | Aug. 22, 1940 |